Patented May 2, 1944

2,348,165

UNITED STATES PATENT OFFICE 2,348,165

COAGULANT COMPOSITION

George T. Buchanan, Chicago, Ill.

No Drawing. Application March 6, 1941,
Serial No. 381,973

1 Claim. (Cl. 260—821)

My invention relates to a new and useful improvement in a coagulant composition adapted for use in effecting a latex deposit upon an article brought into contact with a latex mixture after or before the article is treated with the coagulant composition.

It is an object of the present invention to provide a coagulant composition of this class which will effect an increase in efficiency which may be easily and quickly applied and mixed and which will be economical in use.

Various other advantages and uses of the invention will appear as the description proceeds.

I have discovered that the use of mica in pulverized form in a coagulant composition attains various advantages over other materials which might be added to a coagulant for latex. The commercial practicability of this composition is now assured since mica may be obtained in colloidal or finely divided form and in this finely divided form I propose to use it.

Experience has shown that when mica is used as a mixture in a coagulant an increase in flexibility is obtained as the mica particles do not break away from the surface of the rubber when subjected to the same amount of flexing which will cause clay or other non-flexible materials to break away.

Another advantage in the use of mica is that mica may be found in natural colors such as gold, bronze, yellow, black, etc. These colors are permanent and are not affected by chemicals used in latex or coagulants as are most dye colors. Consequently, in mixing the coagulant composition, the mica of the proper color may be chosen to harmonize with the particular color of rubber being used. When this harmonizing is effected and the coagulant composition is left on the finished product it will be less discernible because of its blending color.

It is my experience that a very durable feature of mica is that it is difficult to wet the mica. The coagulant salts seem to form around it and due to the fact that the solvent recedes or draws away from the mica particles instead of covering them while drying, various advantages are thus obtained which cannot be obtained by the use of a coagulant having other materials therein. Among these advantages is the fact that the pulling away of the coagulant from the mica as it starts to dry causes the coagulant to dry or set much quicker than the same coagulant would do without the mica.

Another very marked effect is the breaking of the film very quickly around each particle of mica instead of in large cracks. Consequently, instead of leaving a large discernible crack, a great quantity of small breaks are formed which are easily covered by the latex with the result that the finished product does not disclose the presence of large cracks as would be were some other ingredient used than mica.

In the various compositions which I have formed I use what may be termed coagulating salts. The use of coagulating salts in coagulants of this kind is well known and among the salts which may be used are zinc acetate and calcium nitrate in a ratio of one part zinc acetate to three parts of calcium nitrate. Other salts which may be used are magnesium sulfate, calcium chloride, zinc chloride, all used in the proportion of about fifteen parts of the salt to eighty-five parts of water, alcohol, acetone or other suitable solvent.

Any multi-valence salts which are soluble may serve as coagulating salts. An example of a composition which is adapted for use where the finished product is to be removed from the form is as follows: volatile solvent (such as alcohol, acetone, water, etc.) 85 parts; coagulating salts, 15 parts; finely divided mica, 5 parts. These ingredients are all thoroughly mixed together and the color of the mica is determined by the color of the rubber with which it is intended to use the coagulant. In the mixture given above if it is desired to make yellow balloons, the mica would be yellow. If it is to be used with black overshoes, the mica would be black. If it is to be used with a green glove, the mica would be green, etc.

An example of a mixture where the coating is to remain on the article and adhere to it is as follows: solvent such as water, alcohol, acetone, etc., 75 parts; salts, 15 parts; mica, 5 parts; resin (any suitable resin soluble in the solvent used), 5 parts. Experience has shown that any resin which is soluble in the solvent used may be used with satisfactory results, regardless as to whether it is organic, synthetic or other type of resin.

The mica may also be used in the coagulant where rubber cement is used. In one case it would be as follows: rubber cement, 25 parts; solvent, 29 parts; water, alcohol, acetone, etc., 30 parts; mica, 5 parts; salts, 10 parts; a jell or modifying agent, 1 part. For use as the jell or modifying agent I have found karaya gum, bentonite, starch or clay may be used.

When the coagulant having the mica therein, regardless of the particular composition listed above which may be used, is examined under a high-power microscope, fine particles of mica appear like small balls in the center of depressions or pits in the surface. The surfaces of the pits or depressions appear to be coated with dried salts pulled away from the mica before it dried. In actual practice this results in much smaller quantities of salts being required and a coating is provided that is very uniform as to surface and texture.

Another advantage in the use of mica is that the mica, unlike other materials used such as clay, does not retain moisture.

The uniform pulling away of the coagulant from the mica makes it possible to spray large tanks, vats, pipes, fans, etc., without sags or depressions or runs, even when the rubber base type of coagulant is used and three or four sprays to a thickness of ⅛ inch or more is applied. The common practice, as at present carried on unless this particular type of coagulant is used, 50 or more sprays would be required on vertical surfaces or any surface except horizontal flat work, in order to obtain the same thickness of application. Even under such circumstances, large sags and runs have to be cut off before the work is finished, all of which is eliminated with the coagulant possessing the mica. The examples of formulae given are merely specimens of various coagulants in which mica is present. It is recognized that various other specific formulae of a latex coagulant might be used with equally good results, the invention relating particularly in the use of the material referred to and the advantages resulting therefrom.

Experience has shown that with the coagulant mixture described, particularly where the proportion of mica is slightly increased, the coagulant may be used for several applications of the latex. Particularly is this so where a rubber cement is used as the binder.

What I claim as new is:

A coagulant composition for latex comprising rubber cement, 25 parts; volatile solvent 29 parts; water, 30 parts; finely divided mica, 5 parts; coagulating salts, 10 parts; and modifying agent from the group consisting of karaya gum, starch, bentonite, and clay, one part, all thoroughly mixed together.

GEORGE T. BUCHANAN.